March 12, 1957
R. E. McBRIDE ET AL
2,784,515
FISHING FLOAT CONSTRUCTION
Filed Feb. 15, 1955
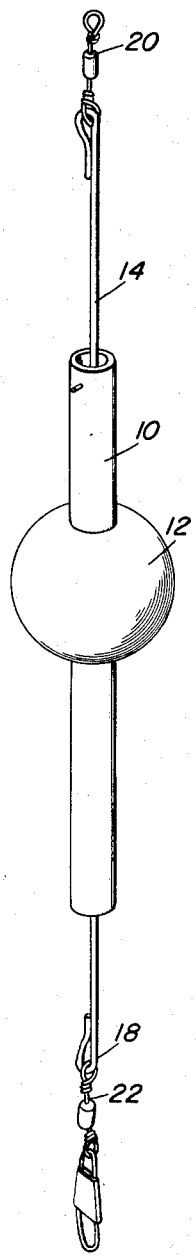
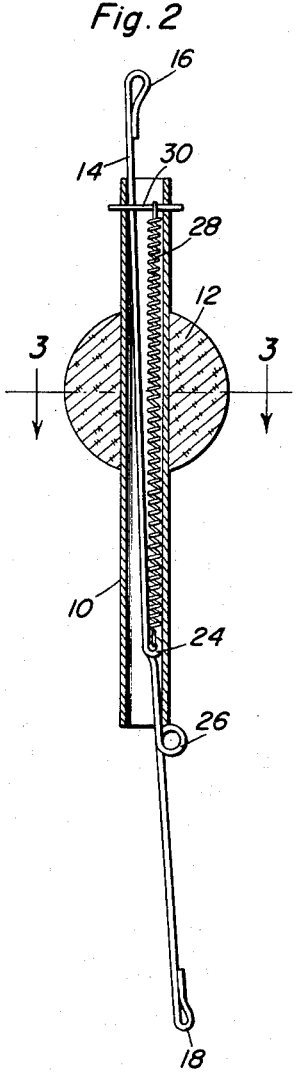
Russell E. McBride
Herbert E. Porter
INVENTORS.

United States Patent Office 2,784,515
Patented Mar. 12, 1957

2,784,515

FISHING FLOAT CONSTRUCTION

Russel E. McBride and Herbert E. Porter, Alexandria, La., assignors to Fishing Fun, Inc., Alexandria, La., a corporation of Louisiana Application February 15, 1955, Serial No. 488,196

5 Claims. (Cl. 43—15)

This invention comprises novel and useful improvements in a fishing float construction, and more specifically comprises a fishing device incorporating in a float a trigger device for setting a fishhook when the fish takes the bait.

The primary object of this invention is to provide a fisherman's float compactly incorporating therein a fishhook setting device having a snap action.

A further object of the invention is to provide a device in accordance with the preceding object wherein the spring of the fishhook setting device shall be compactly housed within a tubular body carried by a float.

A further object of the invention is to provide a device in accordance with the foregoing objects which shall be extremely sensitive in its operation, shall have its spring means entirely housed within the body for protective purposes, and shall be durable and efficient in its operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view showing by way of illustration of the principles of this invention a suitable embodiment for carrying out the invention; and, Figure 2 is a vertical transverse section through the device of Figure 1.

Referring first to the construction of Figures 1 and 2, it will be seen that the combined float and hook setting device comprises a tubular body or sleeve 10 which is of uniform diameter throughout and which is open at both of its ends, and which has affixed in any desired manner to its exterior surface a float 12 of any desired character. Extending through the body 10 and freely movable therein is a trigger member 14 which may conveniently consist of a single piece of wire, although it will be understood that other materials and other constructions of the trigger member are possible.

As illustrated, the actuating member includes looped ends providing eyes 16 and 18 at its upper and lower portions, respectively, to which, as shown in Figure 1, may be secured a connecting member 20 whereby a fishing line may be secured to the device and a further connecting member 22 to which may be secured a fishhook, not shown, by a leader or the like.

In the embodiment of Figures 1 and 2, it will be observed that the trigger member 14 is provided with a pair of loops, such as those shown at 24 and 26, intermediate its extremities. A spring in the form of a coiled tension spring 28 is disposed within and housed by the tubular body, being secured at its extremities as by a transverse pin 30 secured in the upper end of the body and being attached to the loop or eye 24.

The loop 26 comprises a lateral projection upon the trigger member and cooperates with the lower end of the tubular body 10 to comprise a trigger mechanism. When the parts of the device are positioned as shown in Figure 2, the trigger is set, with the spring 28 being stressed and retained in a tensioned position by the trigger mechanism. When the fishhook, not shown, is taken by a fish, the slightest jerk or movement of the same will cause the trigger projection 26 to slide from the end of the sleeve and thus free the spring to impart a snap action to the trigger member and thus set the hook in the mouth of the fish.

It will be observed that in this form of the device, the tubular body is open at both ends, permitting free flow of water therethrough, thus tending to cleanse the interior of the tube as the device is moved through the water by a fisherman.

It should be observed that the trigger device is located upon the exterior of the tubular body. Thus, the trigger device consists of the enlargement formed by the loop 26 and the lower end surface of the tubular body. It is believed that the provision of the trigger mechanism at this point renders the device more sensitive for release by a fish taking the hook, and yet the spring member is entirely enclosed within the device for its protection.

Since numerous modifications and changes will readily occur to those skilled in the art, it is not desired to limit the invention to the exact construction and operation shown and described, and accordingly, all suitable modifications and equivalents may be resorted to, falling within the scope of the appended claims.

What is claimed as new is as follows:

1. A fishing float and hook setter comprising a tubular body having a float surrounding the same midway of its ends, a rod like trigger member disposed in said body and extending from the opposite ends of the same, a spring enclosed at all times in said body, means operatively securing one end of said spring to said body and a loop on said member operatively securing the other end of said spring to said trigger member whereby said spring will resiliently urge said trigger member in a direction to set a hook, said trigger member having its opposite ends adapted for attachment to a fishing line and to a fishhook.

2. A fishing float and hook setter comprising a tubular body having a float surrounding the same midway of its ends, a rod like trigger member disposed in said body and extending from the opposite ends of the same, a spring enclosed at all times in said body, means operatively securing one end of said spring to said body and a loop on said member operatively securing the other end of said spring to said trigger member whereby said spring will resiliently urge said trigger member in a direction to set a hook, said trigger member having its opposite ends adapted for attachment to a fishing line and to a fishhook, and a trigger mechanism disposed exteriorly of said body and operatively associated with said trigger member and said body for retaining said spring in a stressed condition whereby release of said trigger mechanism will allow the spring to impart a snap action to the trigger member, said trigger mechanism being disposed upon the exterior of the body.

3. A fishing float and hook setter comprising a tubular body having a float surrounding the same midway of its ends, a rod like trigger member disposed in said body and having a loop intermediate its ends and extending from the opposite ends of the same, a coil spring enclosed at all times in said body, means operatively securing one end of said spring to said body and operatively securing the other end of said spring to said loop whereby said spring will resiliently urge said trigger member in a direction to set a hook, said trigger member having its opposite ends adapted for attachment to a fishing line and to a fishhook, and a trigger mechanism including a second loop and a cooperating surface on said body engageable by said second loop and operatively associated with said trigger member for retaining said spring in a stressed condition whereby release of said second loop from said surface will allow the spring to impart a snap action to the trigger member, said spring and trigger member being disposed in side by side relation wholly within said body.

4. The combination of claim 3 wherein said first means includes a pin disposed transversely of said body and adjacent one end and said further means includes an aperture in said trigger member.

5. The combination of claim 3 wherein said first means includes a pin disposed transversely of said body and adjacent one end and said further means includes an aperture in said trigger member, said body comprising a tube of uniform diameter open at both ends.

References Cited in the file of this patent

FOREIGN PATENTS

| | | |
|---|---|---|
| 280,761 | Switzerland | May 1, 1952 |
| 763,268 | France | Feb. 12, 1934 |